Mar. 6, 1923.

R. G. RYCROFT.
MECHANICAL COTTON PICKER.
FILED AUG. 29, 1921.

WITNESSES

R. G. Rycroft.
INVENTOR

BY

ATTORNEYS

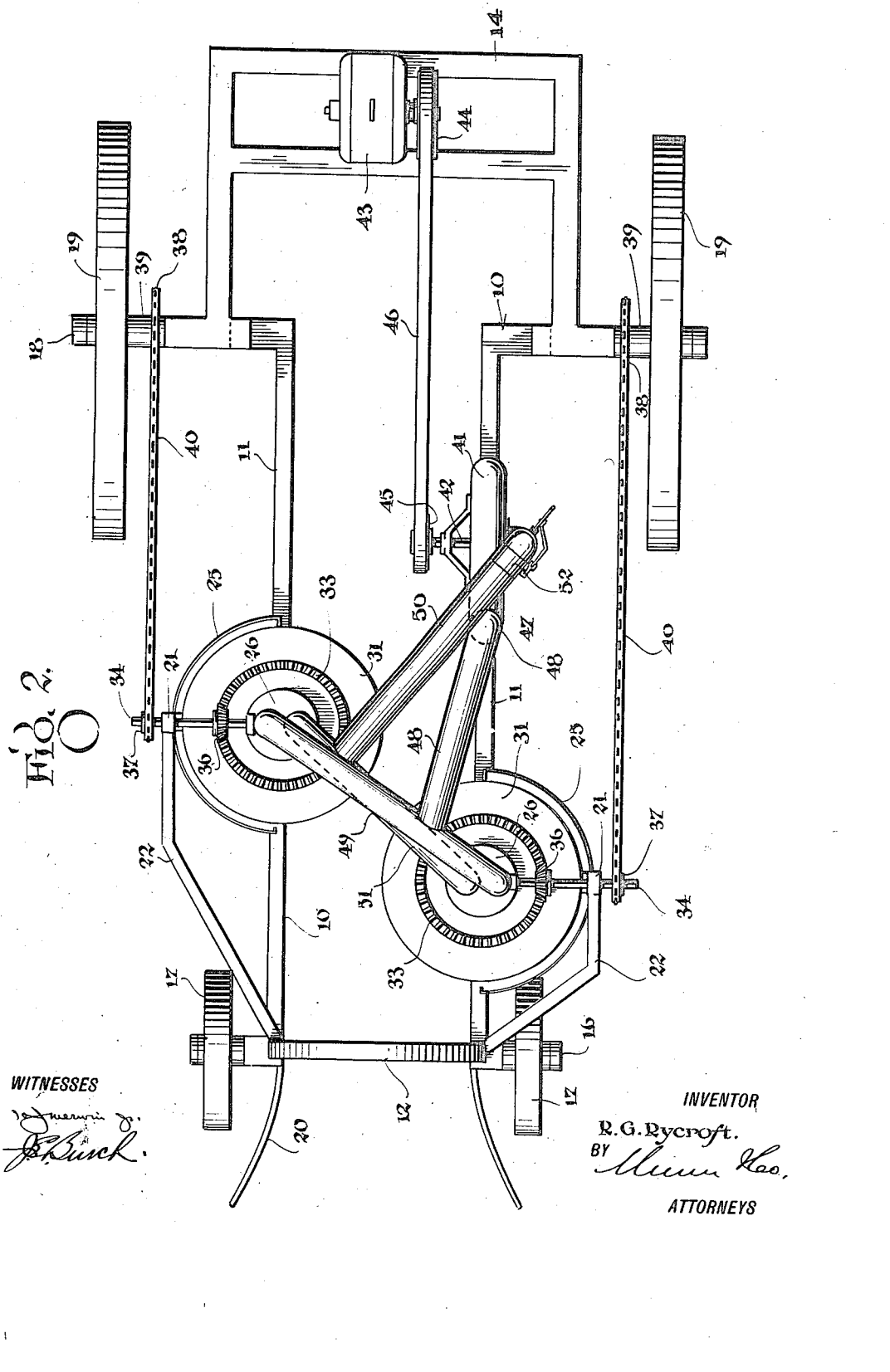

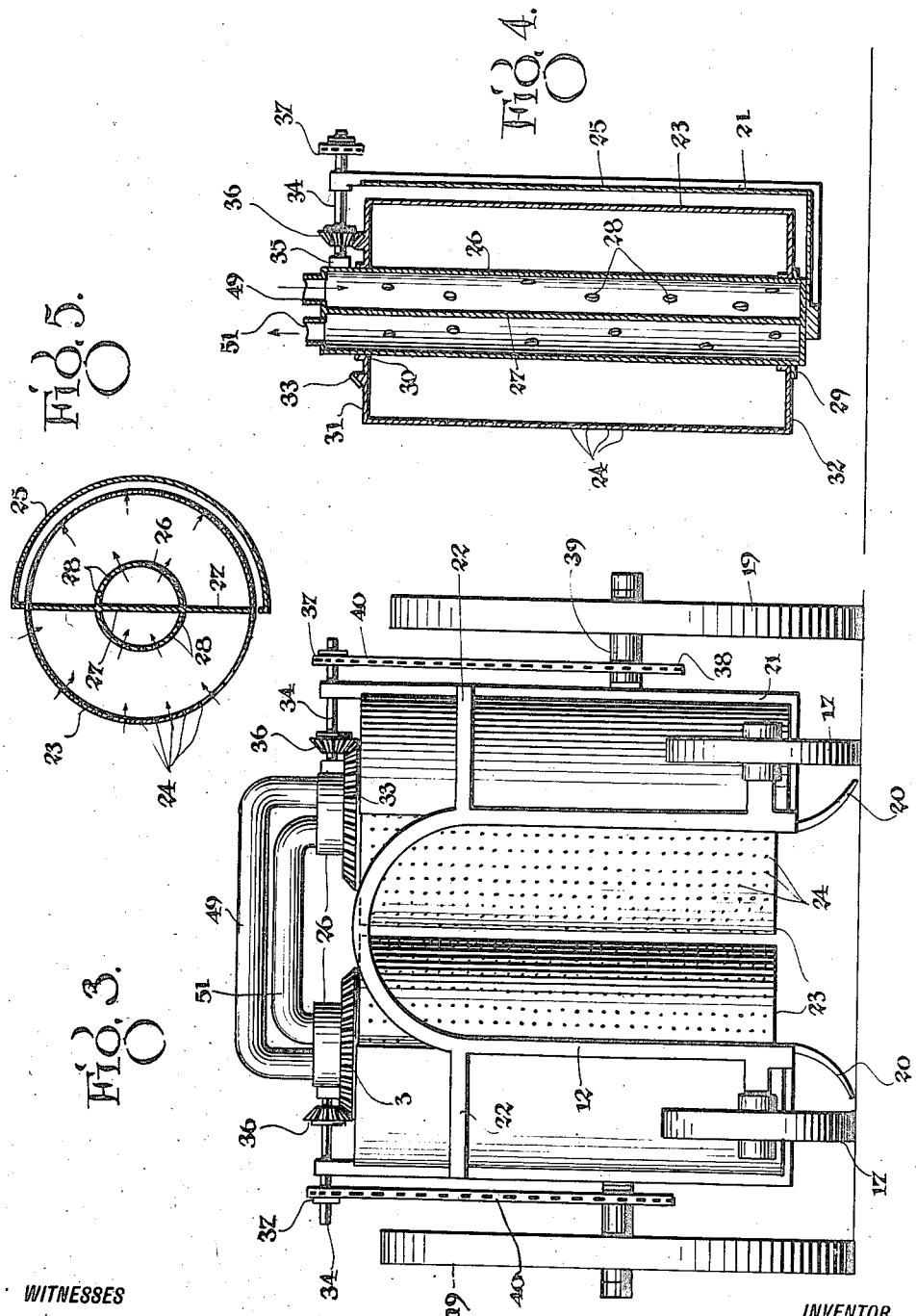

Patented Mar. 6, 1923.

1,447,328

UNITED STATES PATENT OFFICE.

ROBERT GEORGE RYCROFT, OF GREENFIELD, OKLAHOMA.

MECHANICAL COTTON PICKER.

Application filed August 29, 1921. Serial No. 496,327.

*To all whom it may concern:*

Be it known that I, ROBERT G. RYCROFT, a citizen of the United States, and resident of Greenfield, in the county of Blaine and State of Oklahoma, have invented certain new and useful Improvements in Mechanical Cotton Pickers, of which the following is a specification.

This invention relates to cotton pickers and more particularly to a mechanical cotton picker, the object of which is to gather the exposed lint or lock of cotton, leaving the boll and other parts of the plant, as well as foreign matter free, said cotton picker consisting of suitable transporting means or a vehicle to be horse drawn or motor driven and having a frame adapted to straddle the cotton row or row of growing cotton when the cotton is in condition or ready to be picked and having means for picking up and guiding the plants, and particularly all low branches thereof into position for action thereon by the picking apparatus which will remove the lint or lock of cotton and discharge the same independently of the boll or other parts of the plant into a suitable receptacle, thereby resulting in a product free from the bolls or other foreign substances so as to render the same more readily saleable at a good price.

Heretofore there has been provided in the art, cotton pickers or picking machines, such as the patent to W. Morava 793,210 June 27, 1905, but such machines remove the bolls from the plant or pick the bolls with the result that the vital parts of the machine become clogged and require constant attention and cleaning, due to the bolls and other foreign substances or matter clinging to the parts which are required to remove the lint or lock of cotton from the bolls. Other machines gather the bolls and considerable foreign matter therewith, and attempt to separate the lint or lock of cotton from the boll and other parts of the plant, but such machines have also been found objectionable where the material is collected or removed by adhesion. An example may be found in the patent to J. W. Vittetoe 1,225,193 of May 8, 1917 but since the result is a product of lint cotton containing considerable bolls and foreign matter or parts of the plant, the sale price is considerably reduced, and often it is unsaleable at any price. The present invention contemplates overcoming such objections and to provide a machine which does not pick the bolls or other foreign substances or parts of the plants, but which on the contrary, gathers the lint or lock of cotton and leaves all other parts of the plant unmolested, or at least, obviates drawing the same into the machine or to such positions as will clog up and interfere with the operation thereof, and the invention further contemplates the improved means for this purpose with the result that a higher grade of cotton is obtained.

Therefore, as a special object of the invention, the present invention distinguishes from the prior art above referred to in that while it is old to gather the bolls by adhesion and also to gather the lint by passing the bolls through hollow arms, the present invention is designed to gather the lint or lock of cotton by adhesion caused by suction of air through very small holes in the hollow cylinders, the holes being so small that no bolls or stalks will be gathered and no cotton will be taken internally of the cylinders, thus obviating the necessity or possibility of removing the bolls or other parts of the plant with the lint or lock of cotton, the gathering or collecting and the discharging or depositing of the lint into suitable receptacles being continuous and automatic as the cylinders are rotated, while the cylinders are also arranged to act first on one side of the row and then on the other instead of on both sides at the same time in transverse alignment and with consequent destruction of the plant and inefficient operation.

Other objects and advantages of the invention will be apparent during the course of the following description.

In the accompanying drawings forming a part of this application and in which like numerals are employed to designate like parts throughout the same, Figure 1 is a side elevation of a mechanical cotton picker constructed in accordance with the invention.

Figure 2 is a top plan view thereof.

Figure 3 is a rear elevation.

Figure 4 is a detailed vertical sectional view showing one of the cylinders and associated parts, and Figure 5 is a transverse horizontal sectional view of said cylinder.

Figure 1:
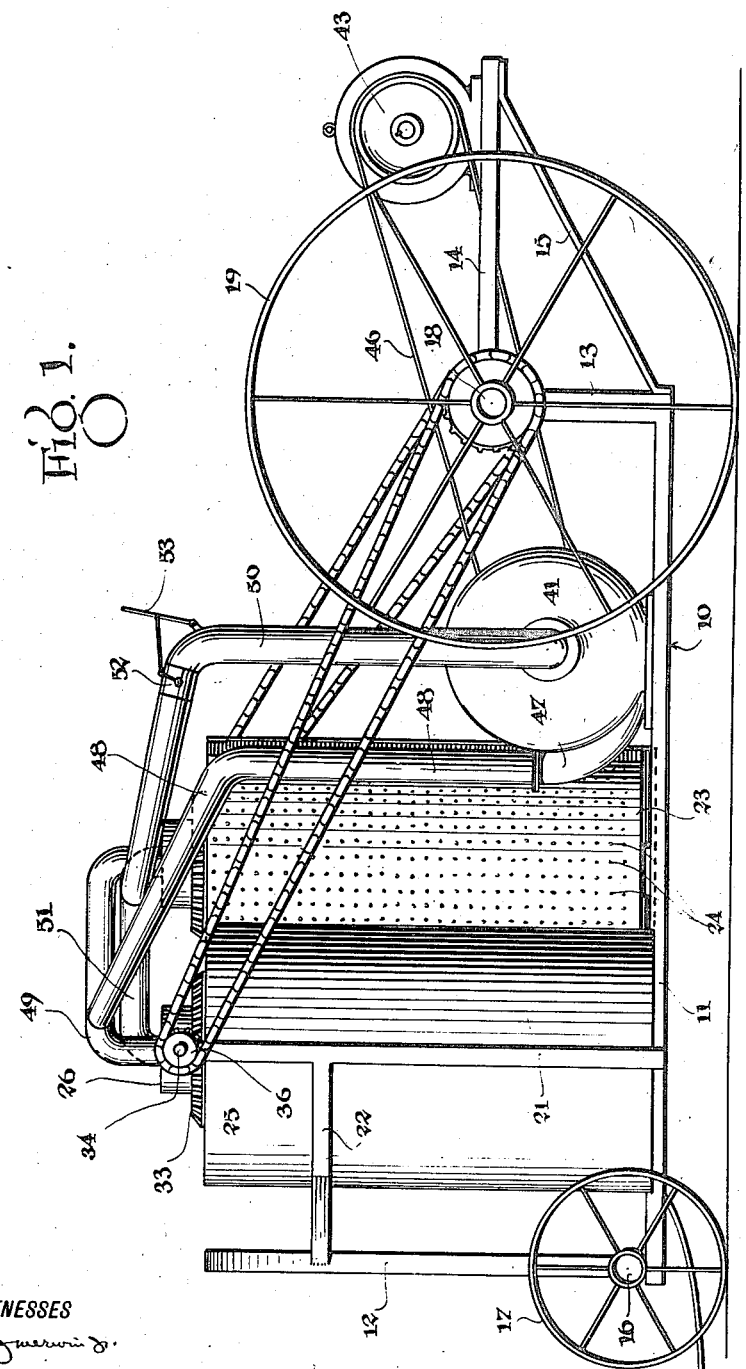

Referring to the drawings in detail, in which like reference characters designate corresponding parts throughout the several views, and in which for purposes of illustration is shown the preferred embodiment of the invention, my improved mechanical cotton picker or machine is shown as comprising a suitable vehicle to be horse drawn or motor driven, as is common in the art. It consists of a wheeled main frame 10 which is relatively low and comprises spaced horizontal side bars 11 connected at their forward ends by an arch 12 and having at their rear ends outwardly and upwardly directed portions 13 from which extend a rearwardly projecting horizontal super-frame or platform 14 braced by inclined side braces 15 and designed to clear the rows of growing cotton plants which the machine straddles, by reason of the spaced side bars of the frame, constructed as already described.

At the forward end of the frame there is provided outwardly directed stub axles 16 on which are journaled the relatively small front ground or transporting wheels 17 adapted to support the forward portion of the machine, while the upwardly and outwardly directed portions 12 are provided with outwardly directed stub axles 18 upon which are journaled relatively large rear ground or transporting wheels 19 and in this connection, it should be observed that the rear portion of the frame is wider than the front portion and the wheels 19 are thus disposed considerably outwardly of the wheels 17 and this also permits the accommodation of the rearwardly projecting horizontal superframe or platform 14 as heretofore described. The frame is open from end to end, and at the forward end of the frame are forwardly and outwardly directed fingers 20, thus producing a flaring or funnel-shaped receiving portion constituting the mouth of the machine, said fingers also extending forwardly and downwardly so as to take up and guide all low branches of the plants into the machine.

Extending outwardly and upwardly from the side bars 11 and in advance or staggered relation near the forward end of the frame, are L-shaped uprights 21 which are braced to the arch 12 by angular horizontal braces 22. Rotatably mounted on the side bars with axes parallel to the uprights are two hollow perforated picking cylinders 23 so as to project half inwardly and half outwardly of the side bar, the perforations or holes in the cylinders extending in rows or otherwise entirely around the same and being of such small size and shape so as not to admit a cotton seed, whereby suction through them will be sufficient to remove the lint or lock of cotton without holding a round object such as a boll or any part of a stalk. The manner of rotatably mounting the cylinders is shown particularly in Figure 2 of the drawings and it will be noted that there is arranged outwardly of the outer projecting halves of the cylinders, semi-circular shield plates 25 while the lower ends of the cylinders are supported by the uprights 21 and engaged with circular or cylindrical upright conduits or hollow shafts 26 which are disposed concentric with the cylinders and are divided by a diametrical imperforate partition 27, extending clear across each conduit and also across the cylinder but terminating adjacent to or in contact with the inner wall of the cylinders as more particularly illustrated in Figure 5 of the drawings. The partitions 27 at opposite sides of the frame are disposed substantially in parallel relation in respect to each other and in respect to the longitudinal axis of the frame. The conduits are provided with perforations as indicated at 28 and the partitions divide the same into two semi-cylindrical chambers forming a double wind trunk, the conduits being stationary and the cylinders 23 revolving around the same, as indicated at 29 and 30, the upper and lower ends of the cylinders being closed by the end walls 31 and 32 as shown.

Provided on the upper ends of the cylinders is suitable means for rotating the same, or beveled gears 33, the conduits projecting above the upper ends of the cylinders as illustrated. The upper ends of the uprights 21 have horizontally journaled therein, shafts 34 near the outer ends of the latter, while the inner ends are supported by the conduits in suitable bearings as indicated at 35 and the shafts have fixed thereto, miter or beveled gears 36 disposed in mesh with the gear rings or miter gears 33. Fixed to the outer projecting ends of the shafts 34 are sprocket wheels 37 around which and sprocket wheels 38 carried by the hubs 39 of the wheels 19 are trained endless drive members in the form of belts or chains 40. By this means as the vehicle or machine is advanced across a field, rotation is imparted to the shafts 34 and from the shafts to the cylinders through the medium of the intermeshing gears, the speed being relatively slow and uniform by reason of the proportion of gears as illustrated.

Mounted upon the frame, that is the main frame as distinguished from the auxiliary frame or platform 13, is a fan 41, the shaft 42 of which may be driven in any suitable manner from the machine or by means of a gasoline or electric motor 43 mounted upon the platform or superframe. As illustrated, the drive wheel or pulley 44 and a pulley 45 on the shaft 42 have trained thereon an endless belt 46 whereby the fan may be driven. This fan constitutes a combined suction fan and a blower or blow fan, and for this purpose there is extended from the casing of the fan near the periphery thereof, a blast port 47 having connected thereto a blast pipe or trunk 48 connected to a pipe forming a wind or blast pipe 49 communicating with the hollow shafts 26 at the outer side of each partition 27 so that the blast of air is discharged into the conduit and through the perforations 28 therein at the outside and also through the perforations 24 of the cylinders at those portions of the cylinders disposed at the sides adjacent the plates 25 as the cylinders revolve or rotate, as shown in Figure 5 of the drawings at the right-hand side.

Leading from the center or axial portion of the fan casing, is a suction air pipe or trunk 50, the same extending upwardly as does the blast pipe or trunk 48 and having connection with a suction air trunk 51 between the ends of the latter, in the same manner that the blast air trunk 48 is connected to the pipe 49. The pipe or trunk 51 is connected at its ends with the conduits 26 at the inner side of the partition 27 to create suction at that side, both trunks leading in at the top, as shown in the drawings, and in Figure 4 especially. Thus, it will be seen that suction is created through the openings or perforations 28 at the inner side of each cylinder or that portion exposed to the plants in the row and by reason of the exhaust air of the fan, a blast of air is forced through the perforations 28 at the outer side and through the cylinder perforations 24. A valve 52 is provided in the suction pipe 50 operated by a handle or lever 53 in any suitable manner, and shown pivoted on the pipe and connected to the valve, so that the suction through the pipe may be regulated as desired.

In the operation of the device, it will be apparent that by means of the drive arrangement described, although the cylinders are positioned in stepped or staggered relation, one ahead of the other, thus necessitating that the drive chains 40 be of different length, yet the gearing is such as to drive or rotate the cylinders in uniformly timed revolutions, the speed of revolution being regulated as desired, but preferably relatively slow, owing to the small miter or bevel gears 36 meshing with the toothed rims or gears 33, which latter are relatively large compared to the gears 36. Thus, as the machine is advanced across a field of plants, so as to straddle the same, the fingers 20 will take up and guide all low branches of the plants into the machine so as to enter between the cylinders. The plants will first be acted on at one side and then at the other by reason of the relation of the cylinders and the suction created at the inner side thereof, thus removing the lint or lock of cotton, and causing the same to adhere to the cylinders where the latter come in contact with the same. In this manner, all of the lint or lock of cotton is removed from the plant and as the cylinders revolve, the rotary motion of the cylinders convey the lint or lock of cotton to the outer side of the partition 27 of each, as particularly indicated by the arrows in Figure 5 of the drawings. The suction through the pipe 51 effects this, and when the cotton is carried to the outer side of each partition 27, it is blown or discharged from the cylinders and may be caught in any suitable receptacle for the purpose, thus collecting the lint or locks of cotton to the exclusion of the bolls or stems, by reason of the continuous operation thus effected while the machine is in action and advanced along the rows of growing plants. In this manner, while adhesion is employed to remove the cotton and gather the lint, yet by reason of the particular construction, size and shape of the perforations in the cylinders, no seeds may enter and no bolls or stalks or parts of the plant will be gathered, and no cotton taken internally of the machine, thus producing a high-grade product, free from all foreign substances, which instead of bringing a reduced price and often rendering the same unsalable at any price, will produce a high-grade product which is readily salable. It is obvious that the motor may be driven by a gasoline engine, by electricity or otherwise, and that the vehicle may be motor driven or horse-drawn, the prime mover being employed to propel the vehicle and to drive the fan, if desired, as is common in the art.

I claim:—

1. A mechanical cotton picker comprising a movably supported frame adapted to straddle a row of cotton plants, upright hollow shafts carried by the frame at opposite sides thereof, said shafts having perforations through the side walls thereof, a cylinder rotatably mounted on each shaft in concentric spaced relation thereto, said cylinders having perforated side walls and the cylinders at opposite sides of the frame being adapted to contact at their proximate sides with opposite sides of the plants of the row, imperforate diametrical partitions dividing each hollow shaft interiorly into two chambers, said partitions extending radially beyond the outer walls of the shafts to terminate close to the inner walls of the cylinders, means for rotating the cylinders, and means connecting with the two compartments of each shaft for causing suction in one of said compartments and an air blast in the other.

2. A mechanical cotton picker comprising a movably supported frame adapted to straddle a row of cotton plants, upright hollow shafts carried by the frame at opposite sides thereof, said shafts having perforations through the side walls thereof, a cylinder rotatably mounted on each shaft in concentric spaced relation thereto, said cylinders having perforated side walls and the cylinders at opposite sides of the frame being adapted to contact at their proximate sides with opposite sides of the plants of the row, imperforate diametrical partitions dividing each hollow shaft interiorly into two chambers, said partitions extending radially beyond the outer walls of the shafts to terminate close to the inner walls of the cylinders, means for rotating the cylinders, and means connecting with the two compartments of each shaft for causing suction in one of said compartments and an air blast in the other.

3. A mechanical cotton picker comprising a movably supported frame adapted to straddle a row of cotton plants, upright hollow shafts carried by the frame at opposite sides thereof, said shafts having perforations through the side walls thereof, a cylinder rotatably mounted on each shaft in concentric spaced relation thereto, said cylinders having perforated side walls and the cylinders at opposite sides of the frame being adapted to contact at their proximate sides with opposite sides of the plants of the row, imperforate diametrical partitions dividing each hollow shaft interiorly into two chambers, said partitions extending radially beyond the outer walls of the shafts to terminate close to the inner walls of the cylinders, means for rotating the cylinders, and means connecting with the upper ends of the compartments of each shaft for causing suction within the compartments approximate to the plants of the row and for causing an air blast within the compartments remote from the plants of the row.

4. A mechanical cotton picker comprising a movably supported frame adapted to straddle a row of cotton plants, upright hollow shafts carried by the frame at opposite sides thereof, said shafts having perforations through the side walls thereof, a cylinder rotatably mounted on each shaft in concentric spaced relation thereto, said cylinder having perforated side walls and the cylinders at opposite sides of the frame being adapted to contact at their proximate sides with opposite sides of the plants of the row, imperforate diametrical partitions dividing each hollow shaft interiorly into two chambers, said partitions extending radially beyond the outer walls of the shafts to terminate close to the inner walls of the cylinders, means for rotating the cylinders, means connecting with the upper ends of the compartments of each shaft for causing suction within the compartments approximate to the plants of the row and for causing an air blast within the compartments remote from the plants of the row, and a shield supported in adjacent relation to the outer portion of each cylinder.

5. In a cotton picking machine, an upright hollow shaft closed at its lower end and having perforated side walls, means for supporting the shaft for movement along the one side of a row of cotton plants, a cylinder rotatably disposed on the hollow shaft with the side walls thereof in spaced concentric relation to the side walls of the shaft, the side walls of the cylinder being perforated, a partition extending diametrically within the shaft and being imperforate, and means for causing a suction within the hollow shaft at one side of the partition and for causing a blast of air within the hollow shaft at the other side of the partition.

6. In a cotton picking machine, a hollow shaft having foraminous side walls and being closed at its one end, a cylinder rotatably mounted upon the hollow shaft and having foraminated side walls arranged in spaced concentric relation to the side walls of the shaft, and an imperforate partition dividing the hollow shaft diametrically and extending radially beyond the outer wall of the hollow shaft to terminate close to the inner walls of the cylinder.

ROBERT GEORGE RYCROFT.